Dec. 13, 1960        G. B. FOSTER        2,964,631

MEASURING SYSTEM

Filed June 30, 1958        2 Sheets-Sheet 1

INVENTOR
George B. Foster
By Anthony D. Cennamo

Dec. 13, 1960

G. B. FOSTER 2,964,631

MEASURING SYSTEM

Filed June 30, 1958

MEASURED THICKNESS T ⟶
$(Mg/Cm^2 \times 10^3)$

INVENTOR
George B. Foster
By Anthony D. Cennamo

United States Patent Office

2,964,631
Patented Dec. 13, 1960

2,964,631

MEASURING SYSTEM

George B. Foster, Worthington, Ohio, assignor to Industrial Nucleonics Corporation, a corporation of Ohio Filed June 30, 1958, Ser. No. 745,528

13 Claims. (Cl. 250—83.3)

This invention relates to an instrument for gauging material properties by nuclear radiation measurement techniques, and more specifically it relates to a radiation source assembly of special geometric construction for imparting certain desirable characteristics to the primary radiation beam so as to facilitate accurate measurement of a class of materials which in the past could be gauged only erratically or with marginal success.

The invention will be illustrated and described in connection with a so-called "thickness gauging" operation of the radiation-absorption type wherein the measured article consists of a sheet of material having a nominally uniform thickness cross-section which is gauged by placing the same between a source of penetrative radiation and a detector therefor so that the degree of attenuation of the radiation beam incident on the detector provides the indication of thickness.

The terms "thickness gauge" and "thickness" as used herein, however, will be broadened by definition to include a large class of outwardly different instruments and measured variables having a basic similarity, among which are the following:

(1) A gauge for measuring weight per unit area or thickness by the radiation absorption method, such as is described in U.S. Patent No. 2,264,725 issued December 2, 1941, to W. E. Shoupp et al., or a gauge for measuring thickness by the radiation reflection method described in U.S. Patent Reissue 22,531, dated August 22, 1944, to D. G. C. Hare.

(2) A gauge for measuring density of a substance, such as is described in U.S. Patent No. 2,316,239 issued April 13, 1943, to D. G. C. Hare.

(3) A gauge for determining ratios of constituents in mixtures, such as is described in U.S. Patent No. 2,487,797 issued November 15, 1949, to H. Friedman, or in U.S. Patent No. 2,534,352 issued December 19, 1950, to G. Herzog.

(4) A gauge for determining the level of materials in tanks, bins, or containers, such as is described in U.S. Patent No. 2,323,128 issued June 29, 1943, to D. C. G. Hare.

(5) Other devices for similar purposes and/or having similar geometries.

These instruments are all characterized in that they employ a source of penetrative radiation, which radiation is modified by interaction with a measured material, and a radiation detector responsive to a characteristic of the modified radiation for indicating a property of the material.

Sources of penetrative radiation for the gauging purposes indicated are of two alternative types; namely, electrical generators such as X-ray tubes and sources using radioactive isotopes. The electrical radiation generators suffer from the disadvantage of instability, in that the radiation beam can not be maintained sufficiently constant to achieve the desired degree of measurement accuracy, so that radioactive sources are preferred.

Certain radioactive sources have proved eminently successful for measurement of restricted classes of materials. However, there are very few radioisotopes available which meet the requirements of economic availability and suitable half-life characteristic. In the group meeting these requirements are krypton-85 and strontium-90 which are a pair of very useful beta-emitters permitting satisfactory absorption thickness measurement of materials up to about 500 mg./cm.$^2$ (milligrams per square centimeter). Measurement of materials heavier than this generally exceeds the capabilities of practical beta-emitters, and the use of a gamma-emitter is to be considered. Unfortunately it is found that the otherwise suitable gamma sources usually produce only monochromatic or dichromatic rays, and furthermore these rays possess energies far in excess of the optimum values for most measurement purposes.

Considering the thickness measurement problem further, it is known that optimum measurement performance is obtained in the region of the "half-thickness" value; the calculations hereof having been reported by Bogachev, Verkhovsky and Markarov in Conference of the Academy of Sciences of the USSR on the Practical Uses of Atomic Energy, translation published 1956 by the U.S. Atomic Energy Commission. The beta-emitter strontium-90 has a half-thickness value of only a few hundred mg./cm.$^2$, while on the other hand the weakest gamma ray (0.67 mev.) provided by a practical radioisotope (cesium-137) has a relatively colossal half-thickness of about 10,000–15,000 mg./cm.$^2$.

The bulk of this large gap may be filled through the use of nuclear-powered X-ray generators such as are described in a co-pending application, Serial No. 434,786, filed June 7, 1954, now Patent No. 2,933,606, by G. B. Foster and W. H. Canter, Jr. These devices provide a variety of radiation beams of selectable energy spectra, having half-thicknesses in the range of about 1,500–7,000 mg./cm.$^2$.

Many industrial processes and inspection operations, however, are such that the range of thickness or other property to be measured overlaps the domains of both the beta-emitter and the device of the co-pending application cited. For example, a reversing type of metals rolling mill may be employed to receive a strip one-eighth inch or so in thickness, to reduce the same in successive passes through the mill, and to finish the strip at a thickness of ten thousandths of an inch or so with the requirement of very close tolerances to be maintained in the finished strip.

In such a case, due to its limited penetrating power beta radiation is totally ineffective for the measurement of the heavy strip necessary to control the reduction thereof, whereas the X-ray device suffers from at least two serious difficulties in the measurement on the finishing passes. Firstly, in accordance with the calculations reported by Bogachev et al. cited, the radiation measurement is characterized by an unfavorable signal-to-noise ratio which results in statistical errors in the instrument readings due to the unsuitable value of half thickness which characterizes this radiation. Furthermore, when the radiation gauge is employed in automatically controlling a high speed process or in automatically calculating the statistical variance or standard deviation thereof, time does not permit sufficient integration of the signal to substantially reduce these statistical errors. Secondly, the X-ray device is much more sensitive to errors due to variations in the composition of the measured material than is the device operating in the beta ray absorption mode of measurement. This problem is particularly serious in a case, for example, where the material comprises an alloy, or where various metallic pigments are present in measured rubber compositions, plastics and the like.

It is apparent from the above considerations that an advance in the state of the art can be made by providing a penetrative radiation source combining the desirable features of the beta radiation source and the stable, medium energy X-ray source.

In accordance with this invention there is provided a capsule containing a suitable beta-emitting radioisotope and a target whereby a portion of the beta radiation is converted to bremsstrahlung, that is, an electromagnetic radiation spectrum, in the manner described in the copending application of Foster et al. cited. The present invention, however, in a preferred form thereof, further provides one or a plurality of openings in the target to permit a calculated portion of the beta radiation to pass through the target unconverted and unattenuated. The composite radiation is modified by interaction with the measured material and the modified radiation is detected in the well known manner. Both types of radiation may thereby contribute to the response obtained from the detector. By appropriately apportioning a ratio of beta rays to X-rays suitable to the requirements of a particular application, the desirable characteristics of a beta gauge and an X-ray gauge are combined in a single instrument capable of satisfactory performance in measuring a range of thickness or another allied property previously impossible of attainment.

It is the object of this invention to provide a radiation instrument of the thickness gauge type as herein defined for accurately measuring a range of thickness values between a few hundred and a few thousand milligrams per square centimeter or equivalent.

It is another object to provide a radiation source assembly of novel geometric construction adapted to modify a beam of beta radiation so as to impart thereto the desirable characteristics of a stable X-ray beam without nullifying the desirable beta ray characteristics.

It is still another object to provide a thickness gauge as herein defined, capable of measuring materials substantially opaque to beta radiation while providing a satisfactory signal-to-noise ratio when measuring materials easily penetrable by beta radiation.

It is also an object to provide apparatus in accordance with the above objects which is both effective for purpose intended and economical to produce.

Further objects and advantages will become apparent in the following detailed description taken in conjunction with the accompanying drawings, in which.

Figure 1:
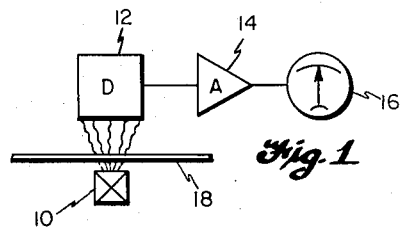
Fig. 1 is a diagrammatic sketch showing the relationship of the elements of one type of radiation thickness gauge.

Referring to Fig. 1, a well-known nuclear radiation absorption thickness gauge may comprise a radioactive source 10, a detector 12, an amplifier 14 and an indicator 16 in the general arrangement shown.

Figure 2:
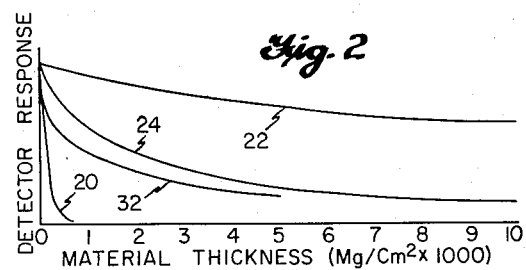
Fig. 2 is a graph showing absorption curves produced by the apparatus of Fig. 1 using different types of radiation sources.

Fig. 2 is a family of the familiar absorption curves characteristic of such apparatus. Each curve is obtained by plotting the thickness of a sheet material sample 18 placed between the source and detector against the corresponding response of the detector as interpreted by the indicator 16 for a group of samples having a wide range of thicknesses. These are actual curves obtained by plotting thickness (actually weight per unit area) in milligrams per square centimeter against detector response in arbitrary units.

Curve 20 is a beta absorption curve produced by a source consisting of strontium-90 and its daughter isotope yttrium-90. Curve 22 is a gamma absorption curve produced by a source consisting of the gamma-emitter cesium-137. The contrast between function 20 and function 22 is apparent in both the thickness ranges involved and the slopes of the curves.

Curve 24 is obtained by the use of a source consisting of a nuclear powered X-ray generator such as is described in the co-pending application above cited of Foster et al. The advantage of this function over those of 20 and 22 when dealing with intermediate thicknesses of materials is apparent to one working in the art, but will be developed further hereinbelow.

Figure 3:
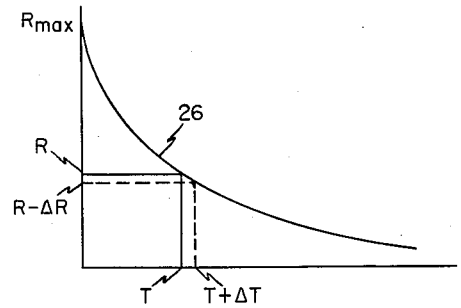
Fig. 3 is a graph showing a curve representing any one of the curves in Fig. 2 reproduced for further development.

In Fig. 3 there is shown a function which may represent any one of curves 20—24 of Fig. 2. Hereon $R_{max}$ indicates the limiting value of the detector response when no material (zero thickness) is interposed between the source 10 and detector 12, so that the detector is subjected to the maximum intensity of radiation from the source. This condition does not ordinarily obtain in a measurement situation, but rather, the matter of immediate interest is the response R which is obtained when a material of some particular thickness T is being gauged. Of even greater interest in the present discussion is the magnitude of the change $\Delta R$ in the detector response when the thickness is changed by an amount $\Delta T$, for this determines the ability of the instrument to electrically resolve slight changes in thickness which occur in a product material of nominal thickness T.

However, from a practical standpoint, the ability to resolve absolute thickness changes is of less significance than the ability to resolve relative thickness changes. Consider an absolute resolution of one thousandth of an inch. When the thickness T is one tenth of an inch, this resolution is one percent of the measured value. In an industrial thickness gauging operation, an accuracy of one percent is considered excellent. On the other hand, if the thickness T is one hundredth of an inch, a resolution of a thousandth of an inch is ten percent of the measured value. An accuracy of only one part in ten is generally unacceptable. It follows that the user of gauging equipment is primarily interested in the resolution of a quantity $\Delta T/T$.

The resolution of $\Delta T/T$ by the thickness gauge is of course an indirect process, wherein the thickness value T is converted to detector response R, and thickness changes $\Delta T$ are converted to corresponding detector response changes $\Delta R$. As is the case of a thickness change, it is a relative response change rather than an absolute response change which is most significant. Following reasoning similar to the case of $\Delta T/T$, it would appear that the relative response change should be represented by $\Delta R/R$. It is found, however, that the ubiquitous quantity $R_{max}$ can never be entirely dispensed with. On the other hand, $R_{max}$ must be reckoned with in the design of every industrial instrument, if for no other reason than the fact that the amplifying system must withstand the sudden application of $R_{max}$ at the input thereof without ill effect in the event of a sheet break (instantaneous removal of the absorber from between the source and detector) which is a common occurrence in industrial processes. Furthermore, $R_{max}$ is an indispensable reference quantity in an instrument adapted for permanent calibration, completely automatic standardization and absolute measurement, as is set forth in U.S. Patent No. 2,829,268 issued April 1, 1958, to H. R. Chope. It follows that electrical resolution is best defined in terms of $\Delta R/R_{max}$, and accordingly an overall expression for the resolution characteristic of a radiation source can be stated as $$Q = \frac{\frac{\Delta R}{R_{max}}}{\frac{\Delta T}{T}}$$

The quantity Q is a figure of merit for the resolving power provided by the absorption characteristic of a radiation beam for a particular thickness value T of a material to be measured thereby.

Figure 4:
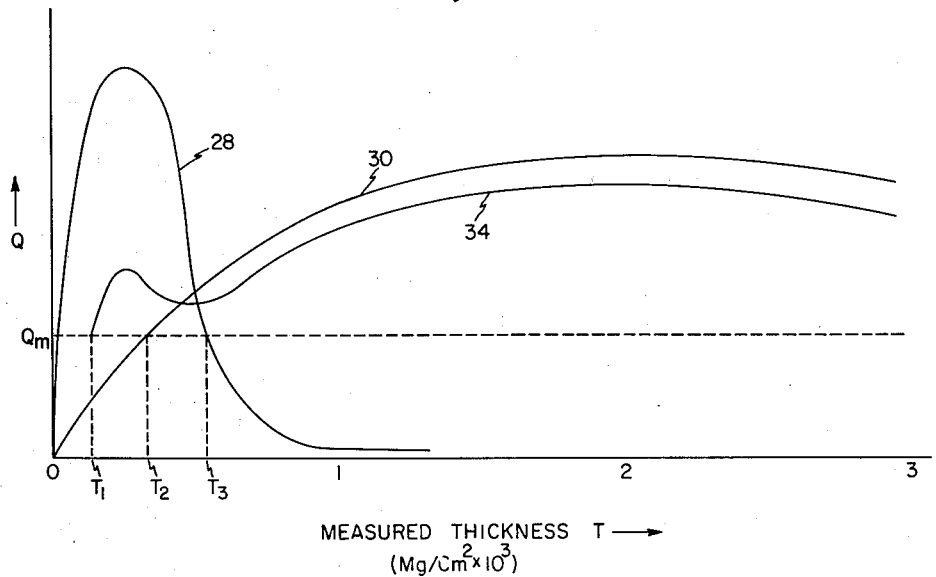
Fig. 4 is a group of curves showing relative resolving power of various radiation source characteristics for a range of thickness of measured material.

Fig. 4 is a group of curves wherein the value of Q has been plotted for a complete range of values of T. Curve 28 is derived from curve 20 of Fig 2, and curve 30 is similarly derived from curve 24. The Q curves emphasize the resolution characteristics, which are not apparent from the absorption curves. As is to be expected, each of curves 28 and 30 exhibits a peak in the vicinity of the half-thickness value of T; decreasing to zero as T approaches zero and asymptotically approaching zero as T is increased beyond the half-thickness.

The minimum value of Q necessary to provide practicable measurement will depend upon a number of factors including the activity of the source used, the quality of the detector, the quality of the design for the electronic measuring apparatus, the quality of the components, the speed of response desired from the instrument, the environmental conditions to be encountered in the use thereof, and the limits of accuracy required. A postulated figure for an exemplary minimum value $Q_m$ is superimposed on the graph of Fig. 4.

Assuming $Q_m$ for a limiting value, it is seen that the beta ray source providing absorption curve 20, whose figure of merit is evaluated by curve 28, is impractical for measurement of materials having a thickness greater than $T_1$. The nuclear powered X-ray source providing absorption curve 24 is shown by the intersection of curves 30 and $Q_m$ to be impractical for measurement of materials thinner than $T_2$.

The present invention provides a means for extending the capacity of the nuclear powered X-ray generator so as to provide a radiation source having essentially all the characteristics depicted by curves 24 and 30, and additionally providing satisfactory measurement of lighter materials in the range of $T_2$ to $T_3$. The actual characteristics of this novel source are shown by curve 32 of Fig. 2 and curve 34 of Fig. 4.

Figure 5:
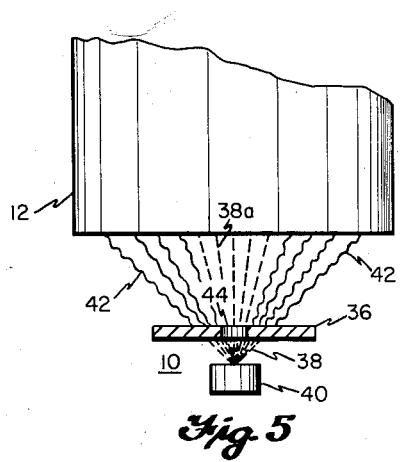
Fig. 5 is a sketch showing the essential details of a source geometry in accordance with one preferred embodiment of this invention.

The essential structure of the new source geometry is depicted in Fig. 5. Therein a target 36 is disposed in the path of a beta radiation beam 38 emanating from a source consisting of a sealed capsule 40 containing a beta emitting radioisotope. The target 36 has a thickness sufficient to substantially prevent any beta particles from issuing in the direction of the detector.

The beta particles impinging on the target have high energies, most of this energy being dissipated initially in multiple ionizations of the target atoms. However, in their flight through the atoms of the target, a minority of the beta particles make close approaches to atomic nuclei, and are powerfully decelerated in regions permeated by intense electric fields. In this process there is an exchange of the kinetic energy of the betas for photons in the field, resulting in the emission from the target of bremsstrahlung; literally, "braking radiation" which comprises a broad spectrum of X-rays represented at 42.

Further in accordance with a preferred embodiment of the invention a drilled aperture 44 is provided in the target 36 to permit a portion of the beta rays 38 to pass through the target unconverted and unattenuated and to issue as shown at 38a in the direction of the detector 12.

Referring again to Figs. 2 and 4, the source assembly described, when installed in the apparatus of Fig. 1, is characterized by an absorption curve as at 32 having a Q function as at 34, thus accomplishing the objects of the invention as hereinabove set forth.

An embodiment of the invention substantially as shown in Fig. 5 has been built and successfully tested, and is therefore considered a preferred construction thereof.

Figure 6:
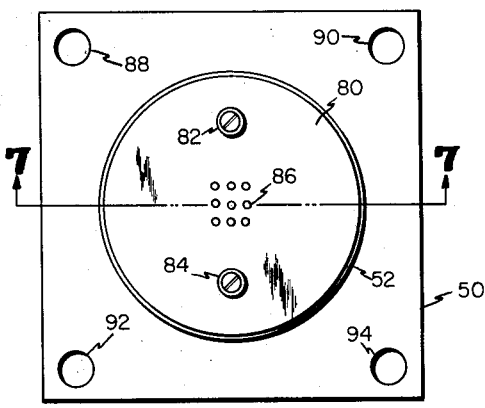
Fig. 6 is a plan view of the structure of a source geometry according to another preferred embodiment of the invention.
Figure 7:
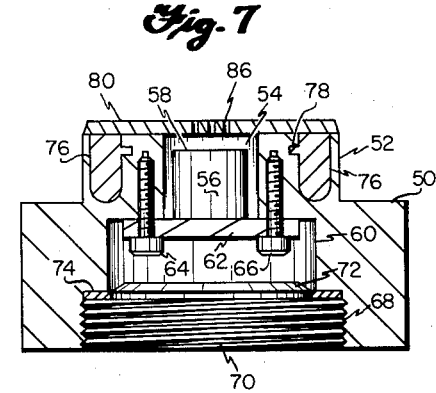
Fig. 7 is a section on the line 7—7 of Fig. 6.

A further preferred construction is illustrated in greater detail in Figs. 6 and 7. The body portion of the source holder or carrier comprises a rectangular metal block 50 having a turned, projecting cylindrical portion 52 integral therewith.

The block 50 is step-bored in three sections along its vertical axis. The inner bore 54, which extends through the top surface of the block 50, accommodates a sealed cylindrical capsule 5 containing a beta emitter radioisotope. A thin window 58 permits beta radiation to issue from the top end of the capsule 56. The middle bore 60 accommodates a source mounting flange 62 which forms an essentially integral part of the source capsule 56. The mounting flange 62 abuts the milled end-face of the middle bore 60 and is secured thereto by screws 64 and 66 which engage threaded holes in block 50.

The outer bore is threaded at 68 to receive a sealing plug 70. The top end of the plug 70 has a projecting portion 72 turned to a slightly smaller diameter than the middle bore 60 which accommodates the same, and the resulting stepped portion of plug 70 is faced to seat a metal gasket 74 which sealingly contacts the milled end-face of the outer bore.

Inwardly from the periphery of the cylindrical portion 52 of block 50, a deep annular groove 76 is cut into the upper face of the projecting portion of the block. Thus the terminal portion of the inner bore 54, which contains the active end of the source capsule 56, is surrounded by the groove 76 in the manner of a moat, and the same is filled with lead to provide better shielding against bremsstrahlung generated in the block which would otherwise issue radially of portion 52 thereof. The resulting lead annulus includes a portion extending into a sub-groove 78 cut into the inner diametrical face of the principal groove 76 so as to secure the annulus in the block.

The target 80, which corresponds to target 36 in Fig. 5, comprises a flat circular disc which sits on top of the projecting cylindrical portion 52 of block 50, and is secured thereto by a pair of screws 82 and 84 whose heads are recessed into countersunk holes in the target disc.

Grouped in the central portion of the target 80 are nine holes as at 86, drilled perpendicular to the target, which occupy a square area of the target. These holes correspond to the aperture 44 in target 36 of Fig. 5.

In a representative source assembly as of Fig. 6 and Fig. 7, the source capsule 56 has a diameter of about 5/8 inch and contains about 150 millicuries of strontium-90. The inner bore 54, which may be considered to define the beam of beta particles incident on the target, has a diameter of about 2/3 inch. The square defined by the axes of the outer eight holes is 7/32 inch on a side. Since target materials of optimum thickness and low atomic number generate a bremsstrahlung spectrum of low average photon energy, which is desirable in the present instance, the material selected for the target 80 is anodized aluminum 1/4 inch in thickness.

Since it is found that no two instruments of this type ever perform exactly alike, it is contemplated that production target discs as used in the assembly of Figs. 6 and 7 should be drilled as at 86 to a diameter of around 0.030 inch, which is the smallest size anticipated for a 9-hole disc. The total area of the nine holes thus comprises slightly less than two percent of the area of the beta beam incident on the target. Thereafter, in the initial calibration of the instrument, the shape of the absorption curve in the critical weight range is tested, and the holes are slightly enlarged on successive trials until an optimum slope is obtained. It is estimated that this optimum slope for a full range of applications should be obtained when the area of the holes is in the neighborhood of between one percent and ten percent of the cross-sectional area of the beta beam incident on the target.

The four holes 88—94 indicated in Fig. 6 are provided for mounting the bomb in the framework of the instrument which utilizes the source.

Figure 8:
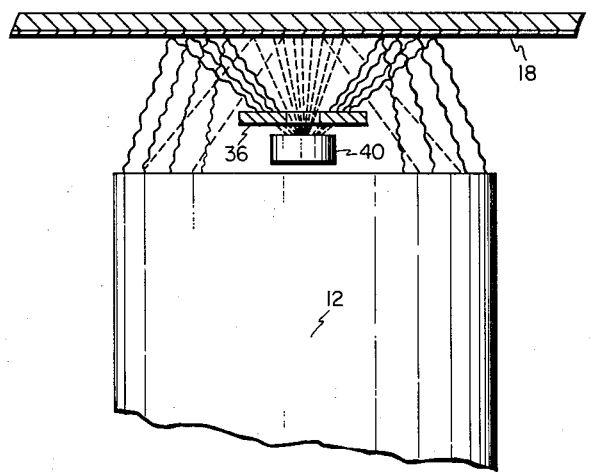
Fig. 8 is a sketch showing the application of the present invention to a radiation reflection thickness gauge.

Referring now to Fig. 8, detector 12 receives both beta and bremsstrahlung radiation reflected back from the material 18. In this embodiment, the source capsule 40 and target 36 are located between the detector 12 and the measured material 18. Reference to the hereinabove mentioned reissue patent to D. G. C. Hare may be had for a more detailed description of a radiation reflection gauge.

Although the preferred arrangements of the new source assembly provide a path for the beta particles through one or a plurality of openings in the target, obviously other equivalent means such as a single target smaller than the area of the beta radiation beam, a plurality of still smaller targets, a matrix or other device can be used to produce the same results, although perhaps not so conveniently. It will be apparent therefore that the detailed structure, constants, dimensions and data herein given are provided merely for the purpose of saving the prospective user of the new source extensive experimentation, and are to be considered exemplary only and not in any way restrictive, since it is obvious that a great many changes, modifications, and outwardly quite different embodiments can be made without departing from the scope of the invention as is set forth in the appended claims.

What is claimed is:

1. A radiation source comprising a radioactive substance producing an emission of beta particles, shielding surrounding said substance, an aperture in said shielding defining a beam of said beta particles, a target, and means for mounting said target in position to block said aperture; said target having a thickness sufficient to absorb at least a majority of any of said beta particles which are incident of the same, a composition selected to provide a predetermined average energy of the X-rays generated when said beta particles bombard atoms thereof, and an area of said composition facing said aperture which is less than the cross-sectional area of said aperture so as to allow a portion of said beta particles to avoid striking said target.

2. A generator for providing a useful beam of penetrative radiation consisting essentially of beta rays and X-rays, said generator comprising a radioactive substance producing an emission of beta particles; a target having a front side, a rear side, a thickness sufficient to absorb at least a majority of any of said beta particles incident on one of said sides, and a composition selected to provide a predetermined average energy of the X-rays generated when said beta particles bombard atoms of said target; means for mounting said target in the path of said emission so as to permit impingement of said beta particles on said front side, and an aperture of selected dimensions in said target to allow unrestricted passage of a portion of said emission from said front side to said rear side so as to intermingle with X-rays issuing from the rear side of said target, thereby forming said useful beam at the rear of said target.

3. An instrument for gauging a property of a material, comprising a quantity of a radioactive substance producing an emission of beta particles, shielding surrounding said substance, an aperture in said shielding for defining a beam of said beta particles directed toward said material, a target, and means for mounting said target in the path of said beam between said radioactive substance and said material; said target having a composition selected to provide a predetermined average energy of the X-rays generated when said beta particles bombard the atoms thereof, a thickness sufficient to absorb at least a majority of any of said beta particles which are incident on the same, and an area of said composition facing said radioactive substance which is less than the cross-sectional area of said beam incident on said target, so as to allow a portion of the beta particles in said beam to avoid striking said target and to mingle with said X-rays issuing from that side of said target which faces said material, thereby forming a composite radiation beam incident on said material; a radiation detector spaced from said material and positioned out of the path of said composite beam between said target and said material for detecting a component of said composite beam which has been modified by interaction with said material, and means for registering the output of said detector.

4. An instrument as in claim 3 wherein said detector is mounted on that side of said material which is opposite said target, and wherein said detected component consists of beta particles and X-rays not absorbed by said material.

5. An instrument as in claim 3 wherein said detector is mounted on the same side of said material which is occupied by said target, and wherein said detector component consists of beta particles and X-rays reflected from said material.

6. An instrument as in claim 3 wherein said composition of said target has an effective atomic number less than 30.

7. An instrument as in claim 3 wherein said area of said composition facing said radioactive substance occupies between one percent and ten percent of said cross-sectional area of said beam incident on said target.

8. A radiation source comprising a radioactive substance producing an emission of beta particles, shielding surrounding said substance, an aperture in said shielding defining a beam of said beta particles, a target, and means for mounting said target in position to block said aperture; said target having a thickness sufficient to absorb at least a majority of any of said beta particles which are incident of the same, a composition selected to provide a predetermined average energy of the X-rays generated when said beta particles bombard atoms thereof, and an aperture of selected dimensions in said target to allow unrestricted passage of a portion of said beta particles.

9. A radiation source comprising a radioactive substance producing an emission of beta particles, shielding surrounding said substance, an aperture in said shielding defining a beam of said beta particles, a target, and means for mounting said target in position to block said aperture; said target having a thickness sufficient to absorb at least a majority of any of said beta particles which are incident of the same, a composition selected to provide a predetermined average energy of the X-rays generated when said beta particles bombard atoms thereof, and a plurality of apertures in said target to allow unrestricted passage of a portion of said beta particles.

10. A radiation source comprising a radioactive substance producing an emission of beta particles, shielding surrounding said substance, an aperture in said shielding defining a beam of said beta particles, a target, and means for mounting said target in position to block said aperture; said target having a thickness sufficient to absorb at least a majority of any of said beta particles which are incident of the same, a composition selected to provide a predetermined average energy of the X-rays generated when said beta particles bombard atoms thereof, and a plurality of apertures in said target to allow a calculated portion of the beta radiation to pass through the target unconverted and unattenuated.

11. A target for the conversion of X-rays from beta radiation comprising a material of sufficient thickness to absorb at least a majority of said beta radiation incident thereon and having a modification thereto to permit a portion of the beta radiation to pass unconverted.

12. A target for the conversion of X-rays from beta radiation comprising a material of sufficient thickness to absorb at least a majority of said beta radiation incident thereon and having an opening therein to permit a portion of the beta radiation to pass unconverted.

13. A target for the conversion of X-rays from beta radiation comprising a material of sufficient thickness to absorb at least a majority of said beta radiation incident thereon and having a plurality of openings therein to permit a portion of the beta radiation to pass inconverted.

References Cited in the file of this patent

UNITED STATES PATENTS

| | | |
|---|---|---|
| 2,629,831 | Atchley | Feb. 24, 1953 |
| 2,769,097 | Lord | Oct. 30, 1956 |
| 2,797,333 | Reiffel | June 25, 1957 |

OTHER REFERENCES

Beta-Ray-Excited Low-Energy X-Ray Sources, by L. Reiffel, from Nucleonics, vol. 13, No. 3, March 1955, pages 22, 23 and 24.